(12) United States Patent
Schreck et al.

(10) Patent No.: US 8,248,898 B2
(45) Date of Patent: Aug. 21, 2012

(54) THERMALLY-ASSISTED MAGNETIC RECORDING HEAD HAVING MAIN WAVEGUIDE AND SUB-WAVEGUIDES

(75) Inventors: Erhard Schreck, San Jose, CA (US); Xuhui Jin, San Jose, CA (US); Tobias Maletzky, Milpitas, CA (US); Joe Smyth, Aptos, CA (US); Dayu Zhou, Fremont, CA (US); Yuchen Zhou, San Jose, CA (US); Kenichi Takano, Santa Clara, CA (US)

(73) Assignee: Headway Technologies, Inc., Milpitas, CA (US)

( * ) Notice: Subject to any disclaimer, the term of this patent is extended or adjusted under 35 U.S.C. 154(b) by 67 days.

(21) Appl. No.: 12/925,283

(22) Filed: Oct. 18, 2010

(65) Prior Publication Data

US 2012/0092971 A1  Apr. 19, 2012

(51) Int. Cl.
*G11B 11/00* (2006.01)
(52) U.S. Cl. .................... 369/13.33; 369/13.13
(58) Field of Classification Search ............. 369/13.33, 369/13.32, 13.13, 13.02, 112.09, 112.14, 369/112.21, 112.27; 360/59; 385/129, 31, 385/88–94; 29/603.01–603.27; 250/201.3, 250/201.5
See application file for complete search history.

(56) References Cited

U.S. PATENT DOCUMENTS

| 7,346,248 | B2 | 3/2008 | Atwater et al. |
| 7,706,654 | B2 | 4/2010 | Peng et al. |
| 2005/0122850 | A1* | 6/2005 | Challener et al. .......... 369/13.24 |
| 2008/0204916 | A1* | 8/2008 | Matsumoto et al. ............ 360/59 |
| 2009/0052077 | A1 | 2/2009 | Tanaka et al. |
| 2009/0165285 | A1 | 7/2009 | Takayama et al. |
| 2009/0185459 | A1* | 7/2009 | Matsumoto ................ 369/13.02 |
| 2010/0103553 | A1 | 4/2010 | Shimazawa et al. |
| 2010/0214685 | A1* | 8/2010 | Seigler et al. .................... 360/59 |
| 2010/0315735 | A1* | 12/2010 | Zhou et al. ...................... 360/59 |
| 2011/0026377 | A1* | 2/2011 | Shimazawa et al. ....... 369/13.24 |
| 2011/0216635 | A1* | 9/2011 | Matsumoto ................ 369/13.33 |

OTHER PUBLICATIONS

Co-pending U.S. Appl. No. 12/928,678, filed Dec. 16, 2010, "Directional Waveguide Coupler for ABS Reflected Light," same assignee as the present invention.

* cited by examiner

*Primary Examiner* — Tan X Dinh
(74) *Attorney, Agent, or Firm* — Saile Ackerman LLC; Stephen B. Ackerman (57) ABSTRACT

A waveguide structure for aligning a light source to a center waveguide (CWG) in a TAMR head is disclosed and includes two alignment waveguides (AWVG) symmetrically formed about a plane that bisects the CWG lengthwise dimension. Each AWVG has a light coupling section formed parallel to a side of the CWG and captures 0.5% to 10% of the light in the CWG. Each AWVG has an outlet that directs light to a photo detector or camera so that light intensity measurements $l_{AWVG1}$ and $l_{AWVG2}$ for first and second AWVG, respectively, can be taken at various positions of the light source. Optimum alignment occurs when $(l_{AWVG1}+l_{AWVG2})$ reaches a maximum value and $|l_{AWVG1}-l_{AWVG2}|$ has a minimum value. AWVG outlets may be at the ABS, or at the side or back end of a slider. Measurement sensitivity is increased by decreasing the width of the AWVG.

24 Claims, 10 Drawing Sheets

THERMALLY-ASSISTED MAGNETIC RECORDING HEAD HAVING MAIN WAVEGUIDE AND SUB-WAVEGUIDES

RELATED PATENT APPLICATION

This application is related to the following: Ser. No. 12/928,678, filing date Dec. 16, 2010; assigned to a common assignee and herein incorporated by reference in its entirety.

FIELD OF THE INVENTION

The invention relates to magnetic read/write heads based on thermally assisted magnetic recording (TAMR) and in particular to a TAMR head in which alignment waveguides are provided on either side of a main waveguide in order to align the light from a light source toward the center of the main waveguide thereby enabling a more convenient alignment method and reduced power at the light source.

BACKGROUND OF THE INVENTION

TAMR is expected to be one of the future generation of magnetic recording technologies that will enable recording at ~1-10 Tb/in$^2$ data densities. TAMR involves raising the temperature of a small region of a magnetic medium to near its Curie temperature where both of its coercivity and anisotropy are significantly reduced and magnetic writing becomes easier to achieve even with weak write fields characteristic of small write heads in high recording density schemes. In TAMR, optical power from a light source is converted into localized heating in a recording medium during a write process to temporarily reduce the field needed to switch the magnetizations of the medium grains. Thus, with a sharp temperature gradient of TAMR acting alone or in combination with a high magnetic field gradient, data storage density can be further improved with respect to current state of the art recording technology.

In addition to the components of conventional write heads, a TAMR head also typically includes an optical wave guide (WG) and a plasmon antenna (PA) or plasmon generator (PG). The waveguide serves as an intermediate path to guide light from a light source to the PA or PG where the light optical mode couples to the local plasmon mode of the PA or to the propagating plasmon mode of the PG. After the optical energy is transformed to plasmon energy, either with local plasmon excitation in the PA or with energy transmission along the PG, it is concentrated at the medium location where heating is desired. Preferably, the heating spot is aligned with the magnetic field from the write head to realize optimum TAMR performance.

Figure 1A:
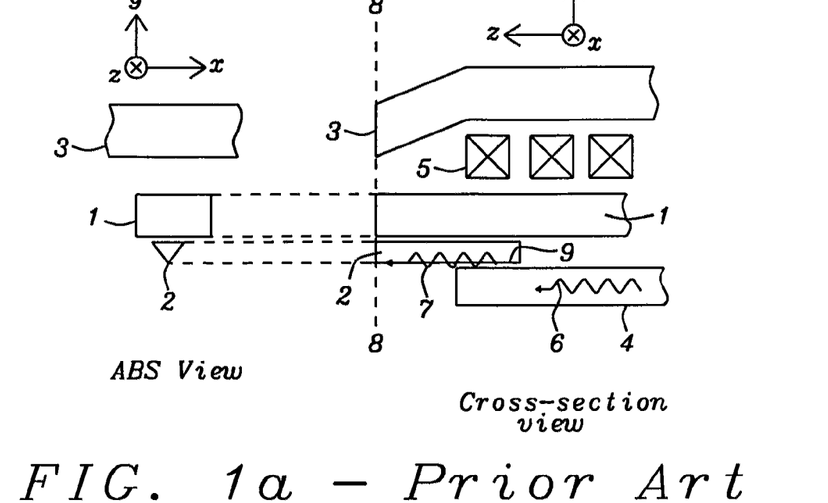
FIG. 1a shows a prior art TAMR structure with a plasmon generator having a triangular shape and operating in an edge plasmon mode.
Figure 1B:
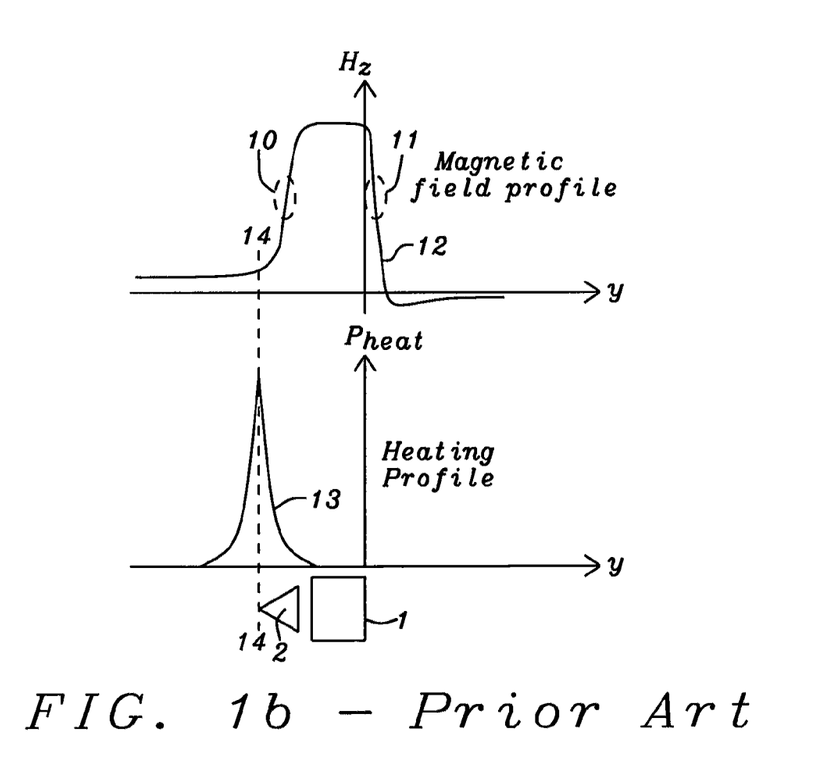
FIG. 1b shows the overlap of the heating profile with the magnetic field profile at the ABS/media interface.

A thermally assisted magnetic head structure disclosed in U.S. Patent Application Publication 2010/0103553 employs an edge plasmon mode that is coupled to a waveguide as represented in FIG. 1a. Conventional components of a magnetic recording structure are shown as a main pole 1, return pole 3, and write coils 5 formed along an air bearing surface (ABS) 8-8. The wave guide 4 guides the input optical light wave 6 toward the ABS 8-8 in the center cross-sectional view. As shown in the prospective view, plasmon generator 2 has a triangular shape and extends a certain distance from the ABS before meeting WG 4. Optical wave 6 couples to the edge plasmon (EP) mode 7 that is excited and propagates along the sharp edge 9 of plasmon generator 2 adjacent to the WG 4. Plasmon mode 7 further delivers the optical power toward the ABS and locally heats a medium (not shown) placed underneath the plasmon generator 2. A plasmon generator is typically made of noble metals such as Ag and Au that are known to be excellent generators of optically driven surface plasmon modes. The local confinement of the edge plasmon mode 7 is determined by the angle and radius of the triangle corner. In FIG. 1b, the magnetic field profile and heating profile are shown with slopes 10 and 13, respectively, that have a slight overlap along the dashed vertical line 14-14.

In TAMR recording, it is necessary to deliver a maximum amount of light intensity to the plasmon generator from a light source that may be a laser diode (LD) which is directly attached to a waveguide, or a free space light beam focused at the waveguide inlet by means of a lens. Because the waveguide has a cross-track dimension of less than a micron, alignment accuracy is critical and is preferably done in an active fashion. Alignment optimization is important since it reduces the source power required to deliver a certain plasmon wave energy at the ABS and guarantees the correct mode excitation in the waveguide. For a laser diode, it is beneficial to use a low power to improve the lifetime and reduce localized heating that could cause degradation. A low power regime also means a smaller LD that can conveniently fit into the limited space at the back end of the slider.

Alignment is typically performed during the head fabrication process in a non-write situation when the main waveguide is not used to deliver light to a near field device. One must keep in mind though that alignment components built into a TAMR head will be present during a subsequent write process and should not interfere with the main transmission mode in the central waveguide. Alignment preferably occurs before a LD is physically attached to a waveguide and is considered a one time set up procedure. However, for a focused beam that is transmitted by means of a lens and mirror, for example, it is conceivable that the alignment could be repeated more than once including during periods after TAMR head fabrication is completed.

In U.S. Patent Application 2009/0052077, a waveguide is formed on either side of a central waveguide for alignment purposes. The side waveguides extend from the ABS to the back end of the slider and are parallel to the central waveguide along its entire length. Side waveguides have a larger cross-sectional area at the ABS than the central waveguide and transmit a substantially higher light intensity than the central waveguide.

U.S. Patent Application 2009/0165285 describes a method of measuring the light intensity within the core of a waveguide by employing a light shield to block the path of light emitted through the waveguide cladding.

U.S. Patent Application 2008/0019648 discloses a method for manipulating light with tunable ferroelectric photonic devices which could be used to measure light intensity.

In U.S. Pat. No. 7,706,654, a dual waveguide configuration is disclosed where a first waveguide made of Ta$_2$O$_5$ or the like delivers light onto a focal region at an interface with a second waveguide comprised of metal layers and a tapered opening adjacent to the focal region.

SUMMARY OF THE INVENTION

One objective of the present invention is to provide an improved alignment scheme for a TAMR waveguide structure thereby enabling a reduced power requirement at the light source and causing no interference with the excitation mode in the main waveguide that transmits light to a nearfield device such as a plasmon generator.

A second objective of the present invention is that the alignment scheme according to the first objective relies on a simple measurement technique that does not involve complicated intensity and pattern comparison measurements.

These objectives are achieved in the present invention wherein a TAMR write head comprises a main waveguide that receives light from a light source and then delivers a substantial portion of the input light energy to a near field device such as an edge plasmon generator (EPG). The EPG transforms light into plasmon waves and produces a near field at the ABS and recording media. According to one embodiment of the present invention, the main waveguide has a lengthwise dimension that extends from the ABS to a back end of a slider and is comprised of three sections from a top-down perspective wherein one axis is a cross-track direction and a second axis represents a direction perpendicular to the ABS and towards the back end of the device. A first section has a rectangular shape with an end at the ABS, an opposite end formed a first distance from the ABS along a first plane, and a width in a cross-track direction wherein the first distance along the two sides is substantially larger than the width. There is a second section having a trapezoidal shape with a first end adjoining the end of the first section at the first plane, a second end that has a width substantially greater than the width of the first section, and two sides connecting the first and second ends of the second section. A third waveguide section adjoins the second end of the second section and extends in a lengthwise dimension to the back end of the slider. In one aspect, the third section has the same width as the second end of the second section. The EPG may have a triangular shape with two sides comprised of a plasmon layer that converges at a vertex (tip) which is essentially an edge that faces a top or bottom surface of the first waveguide section and is separated therefrom by a gap distance. The EPG extends 1 to 2 microns from the ABS and may be located in a down-track direction from the main waveguide.

A key feature of the waveguide structure is the addition of an alignment waveguide (AWVG) on either side of the main waveguide. The two AWVG form a symmetrical design with respect to a center of the main waveguide from a top-down view and extend a first distance from the ABS according to a first embodiment of the present invention. Each AWVG is comprised of three sections including a first rectangular section with an end at the ABS and two sides formed parallel to a side of the first main waveguide section. A side of each first AWVG section faces the main waveguide and is separated therefrom by a second distance. An end of each first AWVG section opposite the ABS adjoins a first end of a second AWVG section that angles toward the first main waveguide section such that a second end of the second AWVG section is a lesser distance (coupling gap distance) from the main waveguide than the second distance. The third (light coupling) section of each AWVG is a rectangular shape that extends a coupling length distance from the second end of a second AWVG section and in a direction parallel to the main waveguide. Preferably, the cross-track dimension (width) for each AWVG section is the same value and is less than the width of the first waveguide section. Optionally, the AWVG may terminated between the ABS and first plane, or extend beyond the first plane in which case the coupling section is formed parallel to a second main waveguide section.

Improved alignment capability is achieved since light propagating in the main waveguide toward the ABS is partially diverted into the two AWVG at the coupling sections. An outlet of each AWVG is at the ABS so that a light beam captured by each AWVG is directed to a photo detector where light intensity is measured or to a CCD camera where an image is taken and the image data transmitted to a computer where the light intensity for each of the two AWVG outlets is calculated. The coupling length and width of the light coupling sections as well as the coupling gap distance may be changed to adjust the light intensity captured by each AWVG. Optimum alignment in a down-track direction is realized when the sum of the light intensity for both AWVG is maximized at a given LD power at the light source, and alignment in a cross-track direction is achieved when the difference in light intensity $|I_{AWVG1}-I_{AWVG2}|$ is minimized. Thus, light output from the main waveguide does not need to be monitored unlike prior art alignment schemes. In one aspect, the width of the light coupling section is less than the width of the adjacent first main waveguide section in order to increase sensitivity and improve the accuracy of alignment measurements which are typically taken during TAMR fabrication before a laser diode (LD) light source is permanently affixed to an end of the main waveguide.

According to other embodiments, the two AWVG may be comprised of a coupling section formed parallel to a side of a second or third main waveguide section, and a second AWVG section that connects an end of the coupling section facing the ABS to an outlet that may be positioned at the ABS, or at a side or back end of the slider. In one aspect, the two AWVGs may be substantially straight structures that extend from the ABS to an end that is proximate to a side of the third main waveguide section and faces the back end of the slider. Preferably, a light block material is formed between the end of the light coupling section and the back end in this embodiment. Optionally, the second AWVG section may curve and terminate at the nearest slider side or the second AWVG section may curve at least 180 degrees and terminate at the back end of the slider. Preferably, the width of the light coupling sections and second AWVG sections are equivalent.

DETAILED DESCRIPTION OF THE INVENTION

The present invention is a waveguide structure for use with a nearfield device such as an edge plasmon generator (EPG) in a TAMR write head and primarily relies on two alignment waveguides to align a light source to a main waveguide. The main waveguide may also be referred to as the central waveguide and typically includes a core with a surrounding cladding layer. Alignment waveguides are hereafter referred to as AWVG. Moreover, the write head may be part of a merged read/write head design. The present invention is also a method for aligning light intensity proximate to the center of the main waveguide and includes a scheme whereby light emitted by a light source and captured by the main waveguide is partially diverted into two adjacent AWVG that may have an outlet at the ABS, or on the sides or end of the slider. The partial transfer (diversion) of light from a main waveguide to an AWVG may also be referred to as coupling. Top and bottom surfaces of TAMR components including the main waveguide and AWVG face either a down-track direction or opposite to the down-track direction.

Figure 2:
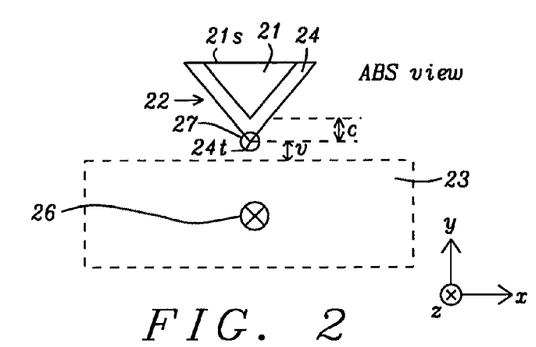
FIG. 2 is an ABS view showing an edge plasmon generator that is separated from a waveguide by a gap distance according to an embodiment of the present invention.

Referring to FIG. 2, an edge plasmon generator (EPG) design is shown that was previously disclosed by Headway in patent application Ser. No. 12/456,290 and has a triangle shape to couple the edge plasmon mode 27 concentrated at tip 24t to the input light 26 from the waveguide 23 that may be recessed from the ABS. Unlike the prior art, EPG 22 comprises a magnetic core 21 and a plasmon layer 24 having a thickness c on two sides which converge at tip 24t facing the waveguide 23. Magnetic core 21 and main pole layer (not shown) may be comprised of one or more of Co, Fe, Ni, and B, or alloys thereof. In one aspect, the main pole and magnetic core 21 may have the same composition. Plasmon layer 24 is preferably made of Au and/or Ag with a thickness c from about 10 to 100 nm and extends in a z-axis (lengthwise) direction perpendicular to the ABS. In one embodiment, plasmon layer 24 includes two sides which converge at a vertex or tip 24t to form a "V" shape and overlay on the magnetic core 21 that forms a third side of the EPG 22. Note that the third side 21s preferably adjoins main pole and may be considered part of the leading side of the main pole layer. It should be understood that the main pole (and TAMR head) move opposite to the y-direction or down-track direction during a write process. The x-axis represents the cross-track direction while the z-axis is towards the back end of the device. In an alternative embodiment, there may be a separation layer between side 21s and the main pole.

The plasmon mode is produced by radiative coupling with optical frequency electromagnetic radiation generated by an optical laser or the like and is transmitted toward the ABS within the plasmon layer 24 while the magnetic core 21 concentrates magnetic flux close to the heating point of the EPG and enhances the magnetic field (not shown) at the magnetic medium heating location during writing. Thus, the EPG 22 effectively becomes an extension of the magnetic pole and generates a magnetic field whose maximum gradient overlaps the magnetic medium region being heated by edge plasmons produced in the plasmon layer 24. The close overlap improves the effectiveness of a magnetic field from the write pole in changing local magnetization of the magnetic medium so that magnetic writing is greatly enhanced and can be confined to small surface areas. The gap distance v between tip 24t and waveguide 23 is from 20 to 50 nm and is preferably filled with silicon oxide, alumina, silicon oxynitride, or $MgF_2$ to optimize light transmission between the waveguide and EPG 22.

Figure 3A:
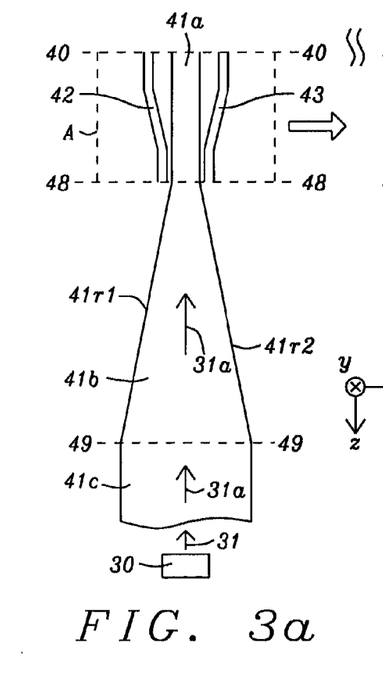
FIG. 3a is a top-down view of a first embodiment of present invention wherein an alignment waveguide is located on either side of a first section of main waveguide.

Referring to FIG. 3a, a first embodiment of the present invention is illustrated. The main pole and surrounding layers of the TAMR head are not shown in order to point out the features of the waveguide configuration. It should be understood that the waveguide structures of the present invention may be employed with any TAMR head and are not dependent on a specific configuration for main pole, near field device, or main waveguide. For example, the TAMR components may sequentially cross over a magnetic medium location in the order of main pole followed by EPG and then the waveguide structure, or in the reverse order.

A top-down view of the exemplary embodiment in FIG. 3a shows a top surface of a main waveguide including three sections 41a, 41b, 41c wherein a first rectangular section 41a has an end at the ABS 40-40 and extends in a lengthwise dimension in a z-axis direction toward the back end of a slider (not shown). An end of the first section 41a facing away from the ABS adjoins a first end of a second section 41b along the plane 48-48 that is parallel to the ABS. Second section 41b has a trapezoidal shape and includes a second end that adjoins the third section 41c along the plane 49-49 formed parallel to plane 48-48, and two sides 41r1, 41r2 that connect the first and second ends. The second end along the plane 49-49 has a greater width in the cross-track (x-axis) direction than the first end at the plane 48-48. Third section 41c is essentially a rectangular shape from a top view with a lengthwise dimension in a z-axis direction. According to one embodiment, an end (not shown) of third section 41c that faces away from the ABS is formed proximate to a light source at the end of the slider. The light source 30 may be fixed to the waveguide end or formed a gap distance therefrom. The y-axis represents the down-track direction.

During a TAMR write process, a substantial portion of light captured by the main waveguide is coupled to a near field device (FIG. 3c) near end 41e and is converted into plasmon waves 31c (FIG. 3b) that are transmitted the final distance to the ABS and produce a near field at the ABS and medium (not shown) proximate to ABS 40-40. In a preferred embodiment, the present invention employs an EPG 22 as the near field device with a plasmon layer as described previously with respect to FIG. 2. The EPG has one end at the ABS 40-40 and extends in a z-axis direction for a distance of about 1 to 2 microns.

Figure 3B:
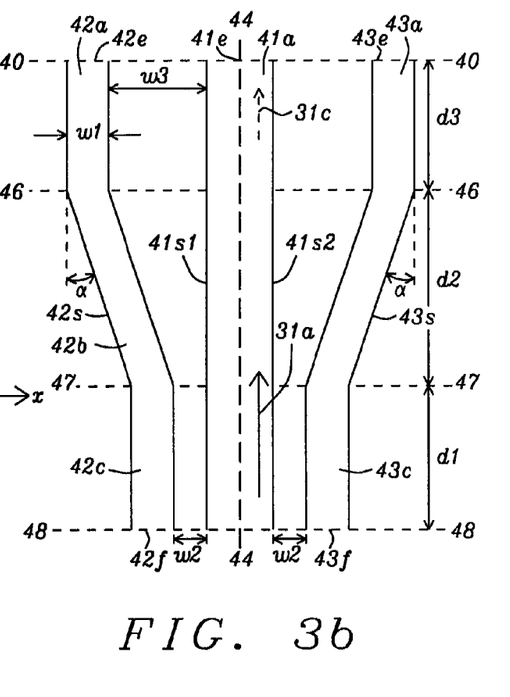
FIG. 3b is an enlarged view of a section of FIG. 3a that depicts each alignment waveguide in more detail.

An important feature of the present invention is the inclusion of two alignment waveguides for performing an alignment procedure during a non-write condition, and preferably just prior to affixing a light source to an end of the main waveguide. Typically, the alignment procedure is only performed once for each TAMR head since the light source should not move from its correctly aligned position once it is attached to the main waveguide. As illustrated in FIG. 3a, two alignment waveguides hereafter referred to as AWVG 42 and AWVG 43 are formed parallel to sides 41s 1 and 41s 2, respectively, of first section 41a (FIG. 3b) and separated therefrom by a distance w3 of 2 to 20 microns according to a first embodiment. Preferably, AWVG 42 and AWVG 43 are symmetrically formed such that they are a mirror image of one another with respect to a plane 44-44 which bisects the main waveguide along the z-axis direction. The symmetrical configuration is advantageous for enabling an alignment method to measure essentially identical light intensities in the two AWVG when light 31a (FIG. 3a and FIG. 3d) is optimally directed toward a center of main waveguide section 41c. Note that FIG. 3b is an enlargement of region A in FIG. 3a. AWVG 42 includes three sections 42a, 42b, 42c each having a width w1 of 0.4 to 0.8 microns. Likewise, AWVG 43 is comprised of three sections 43a, 43b, 43c each having a width w1 in a cross-track direction. Sections 42a, 43a each have an end 42e, 43e, respectively, at the ABS and extend a distance d3 of 1 to 50 microns from the ABS 40-40. Sections 42a, 43a each have a second end along the plane 46-46 where they adjoin a first end of section 42b and section 43b, respectively. Plane 46-46 is aligned parallel to the ABS.

In one embodiment, second sections 42b, 43b have straight sides 42s, 43s, respectively, that are angled toward the center plane 44-44 and terminate at a second end along the plane 47-47 which is separated from plane 46-46 by a distance d2 that is dependent on w3 and the angle α formed by sections 42a, 42b and sections 43a, 43b, respectively. Angle α is preferably between 0 and 30 degrees. In an alternative embodiment, there may be a certain amount of curvature in sides 42s, 43s because of the nature of the fabrication process. In fact, it may be beneficial for the junction or interface of first and second AWVG sections and of second and third AWVG sections to be part of a curved edge so as to minimize light loss which would be larger with junctions having sharp edges or "kinks". Each third (light coupling) section 42c, 43c has a first end adjoining a second end of section 42b, 43b, respectively, a second end along the plane 48-48, and is separated by a coupling gap distance w2 of 0.1 to 0.4 microns from nearest waveguide side 41s1 or 41s2. Light coupling sections 42c, 43c have a coupling length d1 of 1 to 20 microns and a lengthwise dimension formed parallel to main waveguide section 41a.

Figure 3C:
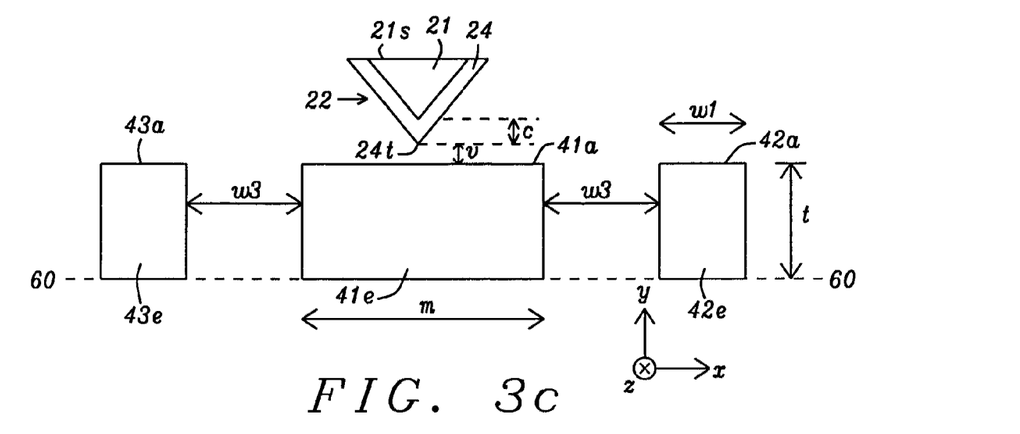
FIG. 3c is an ABS view of the waveguide structure in FIG. 3b with an EPG included according to an embodiment of the present invention.
Figure 3D:
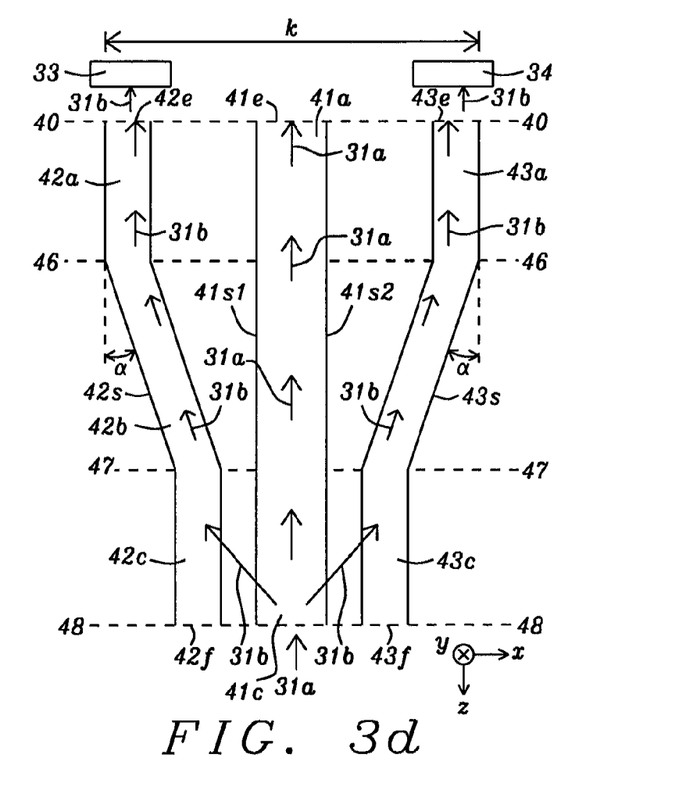
FIG. 3d is a top-down view of the waveguide structure depicted in FIGS. 3a-3b where light propagates from a light source into a main waveguide and then is partially diverted into two AWVG before reaching photo detectors in an alignment process.

Referring to FIG. 3d, AWVG 42 and AWVG 43 are key features of the present invention and are included as critical components of an alignment scheme where a small portion of light 31b, typically 0.5% to 10% of the intensity of light 31a captured by main waveguide section 41c from a light source 30 and transmitted toward the ABS, is diverted into light coupling sections of each AWVG. The light intensity diverted into the AWVG 42, 43 is a small fraction of the light propagated toward the ABS in the main waveguide so as not to disturb the single transmission mode in the main waveguide during a TAMR write process. In particular, the coupling length d1, coupling gap width w2, and AWVG width w1 may be adjusted to modify the intensity of light 31b captured by AWVG 42, 43 along light coupling sections 42c, 43c, respectively. It should be understood that one or more of the following changes may result in an increase in light intensity diverted into AWVG 42, 43: (1) increase in length d1; (2) increase in width w1, and (3) decrease in gap width w2. Moreover, the parameters (1), (2), and (3) are not independent of each other which means adjusting one parameter is likely to affect the other two parameters. One should also consider that due to energy transfer by multimode beating, oscillatory behavior can also play a factor in coupling efficiency.

According to the exemplary embodiment, light 31b is captured by light coupling sections 42c, 43c, transmitted to the ABS at ends 42e, 43e, respectively, and exits through an outlet or aperture (not shown) where light 31b is then transmitted to a photo detector (PD) 33, 34, respectively. In this case, light intensity can be read directly from the photo detectors to achieve optimum alignment. For example, light intensity detected at end 42e by PD 33 is $l_{AWVG1}$, and light intensity detected at end 43e by PD 34 is $l_{AWVG2}$. When $|l_{AWVG1} - l_{AWVG2}|$ reaches a minimum value, then alignment in the cross-track direction is achieved. When $(l_{AWVG1} + l_{AWVG2})$ reaches a maximum value, then alignment is realized in a down-track direction. Therefore, alignment may involve moving the light source along the x-axis direction at the end of the main waveguide facing away from the ABS until $|l_{AWVG1} - l_{AWVG2}|$ is a minimum value at a certain $x_i$ position, and then moving the light source along the y-axis direction at coordinate $x_i$ (not shown) until $(l_{AWVG1} + l_{AWVG2})$ achieves a maximum value. Note that light 31a not diverted to an AWVG continues to propagate through the main waveguide to the ABS but is not measured during the alignment process.

In an alternative embodiment (not shown), photo detectors 33, 34 may be replaced by a CCD camera having a field of view ≧k such that light intensity spots for light 31b exiting both ends 42e, 43e is captured in the same image. The CCD camera is linked to a computer where an algorithm is used to calculate and compare light intensity values from each AWVG 42, 43. Otherwise, the same process as described previously with regard to alignment of the light source position in both of the cross-track and down-track directions may be followed.

Figure 3E:
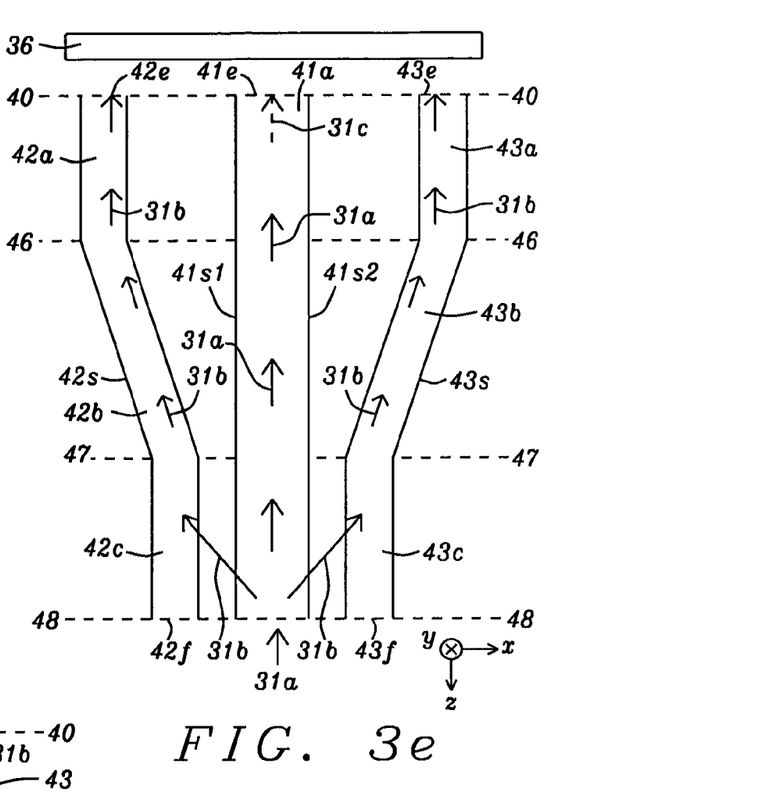
FIG. 3e shows a similar light distribution during a TAMR write process.

It should be understood that after the alignment process identifies the correct (x, y) coordinate for optimal alignment, the light source is affixed to an end of the main waveguide at said coordinate, and TAMR head fabrication continues to completion. Subsequently, during a TAMR write process (FIG. 3e), a substantial portion of light 31a that is transmitted to the vicinity of waveguide end 41e is coupled to an EPG (not shown) and transformed to plasmon waves 31c that are then delivered to a localized spot (not shown) on magnetic medium 36 where a magnetic field is simultaneously directed. Since the AWVG 42, 43 remain in place, it is important that the alignment waveguides do not interfere with the transmission mode in the main waveguide. In addition to maintaining the intensity of light 31b diverted to each AWVG in the range of 0.5% to 10% of the intensity of light 31a by proper choice of d1, w1, and w2, the light coupling sections 42c, 43c at plane 47-47 should be at least 1 micron from the nearest EPG end (not shown) so that there will be time for the transmission mode in main waveguide section 41a to recover after coupling with the AWVGs and before coupling with the EPG. Although the disturbed core modes will not recover, the excited cladding modes will be damped. In other words, there should be a plurality of wavelengths of light 31a separation between plane 47-47 and the EPG so that plasmon wave generation efficiency is not significantly compromised by the diversion of light 31b from the main waveguide.

Referring to FIG. 3c, an ABS view is shown of the waveguide structure depicted in FIG. 3b and also includes an EPG 22 having a vertex 24t facing a top surface of main waveguide section 41a according to one embodiment of the present invention. Side 21s of EPG 22 may adjoin a surface of the main pole (not shown). Vertex 24t is an edge extending in a z-axis direction from the ABS and is separated from section 41a by a distance v of about 20 to 50 nm. Preferably, AWVG section 42a and AWVG section 43a have a thickness t in the range of 350 to 600 nm that is essentially the same as that of main waveguide section 41a, and all sections 41a, 42a, 43a are formed on the same plane 60-60 in order to improve the efficiency of light coupling from the main waveguide into each AWVG. On the other hand, the width w1 of sections 42a, 43a may be advantageously less than the width m of section 41a in order to improve the sensitivity of alignment measurements and thereby improve their accuracy. Distance w3 should be at least 2 microns to prevent diffracted light from the main waveguide from being included in one or both of the $l_{AWVG1}$ and $l_{AWVG2}$ measurements. Preferably, w3 is less than about 20 microns to fit within a standard field of view of a CCD camera.

Figure 4:
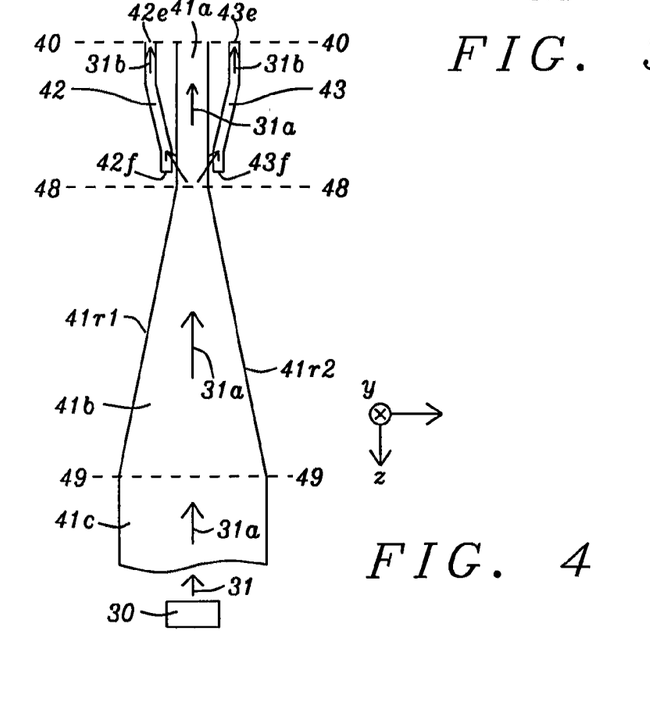
FIG. 4 represents a second embodiment of the present invention wherein the ends of each AWVG are formed a lesser distance from the ABS than an end of the first main waveguide section.

Referring to FIG. 4, a second embodiment of the present invention is illustrated that is a modification of the first embodiment. In particular, all components in the first embodiment are retained except AWVG 42, 43 are shortened in the z-axis direction and terminate between plane 48-48 and the ABS 40-40. According to one aspect, end length d3, coupling gap width w2, and AWVG width w1 are maintained as previously described but one or more of w3, d2 and d1 may be decreased such that ends 42f, 43f terminate before reaching plane 48-48.

Figure 5A:
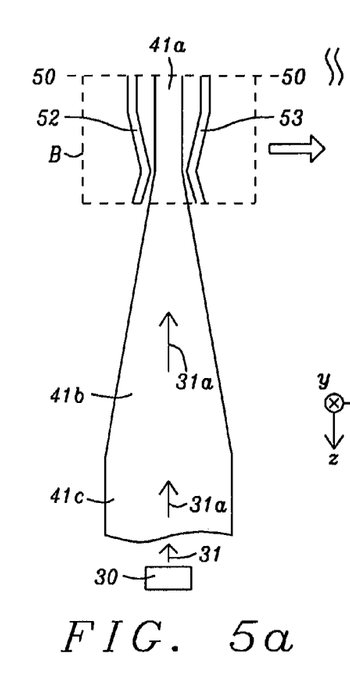
FIG. 5a is a top view of a waveguide structure according to a third embodiment of the present invention in which an alignment waveguide is formed along two different waveguide sections and on both sides of a main waveguide.

Referring to FIG. 5a, a third embodiment of the present invention is depicted from a top view. Dielectric layers, EPG, and main pole are not illustrated in order to point out the important features of the waveguide structure. The main waveguide structure including sections 41a, 41b, 41c is retained from the first embodiment. An end of section 41c captures light 31 emitted from a light source 30 and directs a portion of light 31a thereof towards the ABS 50-50. As explained in a later section, a portion of light 31a transmitted through section 41b is diverted (coupled) into two alignment waveguides 52, 53. A majority of light 31a continues toward the ABS and is coupled into an EPG as described previously so that a near field can be produced at a localized spot on a magnetic medium proximate to the ABS. A description of EPG 22 and surrounding waveguide structure is provided later with respect to FIG. 4c. In the exemplary embodiment, the main waveguide terminates with an end 41e (FIG. 4b) at the ABS but the present invention also encompasses an embodiment wherein an end of the waveguide faces the ABS and is recessed from the ABS.

Figure 5B:
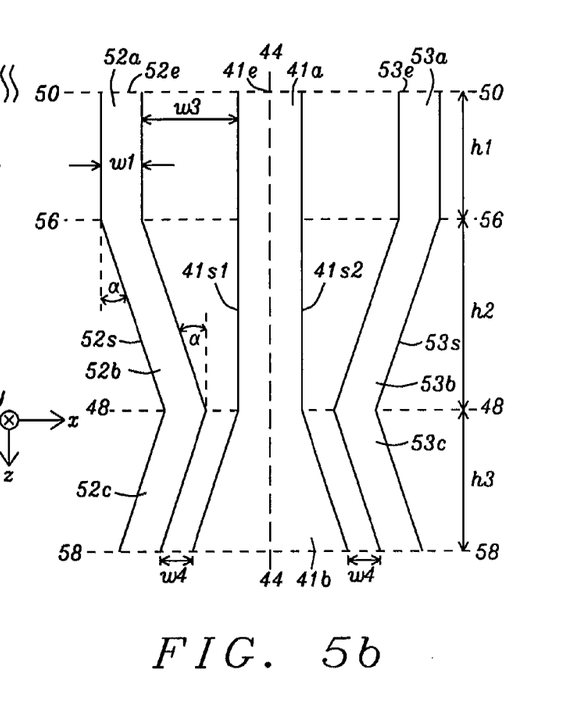
FIG. 5b is an enlarged view of a section of FIG. 5a that shows each alignment waveguide in more detail and FIG. 5c is an ABS view of the waveguide structure in FIG. 5b with an EPG included according to an embodiment of the present invention.

Referring to FIG. 5b, note that the drawing is an enlargement of the waveguide structure within region B in FIG. 5a. In particular, two alignment waveguides hereafter referred to as AWVG 52 and AWVG 53 are formed along sides 41s1 and 41s2, respectively, of first section 41a and a portion of second section 41b. Preferably, AWVG 52 and AWVG 53 are symmetrically formed such that they are a mirror image of one another with respect to a plane 44-44 which bisects the main waveguide in the z-axis direction. The symmetrical configuration is advantageous for enabling an alignment method to measure essentially identical light intensities in the two AWVG when light 31a (FIG. 5d) is optimally directed toward a center of main waveguide section 41c. AWVG 52 includes three sections 52a, 52b, 52c each having a width w1 and AWVG 53 is comprised of three sections 53a, 53b, 53c each having a width w1. Sections 52a, 53a each have an end 52e, 53e, respectively, at the ABS and extend in a z-axis direction parallel to main waveguide section 41a for a distance h1 of at least 1 micron from the ABS 50-50. Sections 52a, 53a each have a second end along the plane 56-56 where they adjoin a first end of section 52b and section 53b, respectively.

In one embodiment, second sections 52b, 53b have straight sides 52s, 53s, respectively, that are angled toward the center plane 44-44 and terminate at a second end along the plane 48-48 which is separated from plane 56-56 by a distance h2. In this case, the first section 41a of the main waveguide also has an end at the plane 48-48 where a side 41s1 is formed a coupling gap distance w4 from the second end of second section 52b and where side 41s2 is formed a distance w4 from the second end of second section 53b. In an alternative embodiment, there may be a certain amount of curvature in sides 52s, 53s because of the nature of the fabrication process. In fact, it may be beneficial for the junction or interface of first and second AWVG sections and of second and third AWVG sections to be part of a curved edge so as to minimize light loss which would be larger with junctions having sharp edges or "kinks". Angle α is from 0 to 30 degrees as in the first embodiment.

Each of light coupling sections 52c, 53c has a first end adjoining a second end of section 52b, 53b, respectively, a second end along the plane 58-58, and is separated by a coupling gap distance w4 of 0.1 to 0.4 microns from nearest waveguide side 41s1 or 41s2. Note that light coupling sections 52c, 53c are formed substantially parallel to the nearest side of main waveguide section 41b and have a coupling length h3 of 1 to 20 microns. Thus, a second end of light coupling section 52c (or 53c) along plane 58-58 is a greater distance from the center plane 44-44 than a first end of light coupling section 52c (or 53c) along plane 48-48.

The second embodiment is believed to offer an advantage over the first embodiment in that a larger amount of light leakage naturally occurs from the cladding in waveguide section 41b than from cladding in section 41a which means a lesser amount of additional light needs to be intentionally diverted into AWVG 52, 53 than into AWVG 42, 43 of the first embodiment in order to generate a sufficiently strong signal at the PD 33, 34 for alignment purposes. Therefore, diversion of light 31b into AWVG 52, 53 is less likely to disturb the main transmission mode of light 31a toward the ABS during a TAMR write process than diverting light 31b from waveguide section 41a into AWVG 42, 43 in the first embodiment.

Figure 5C:
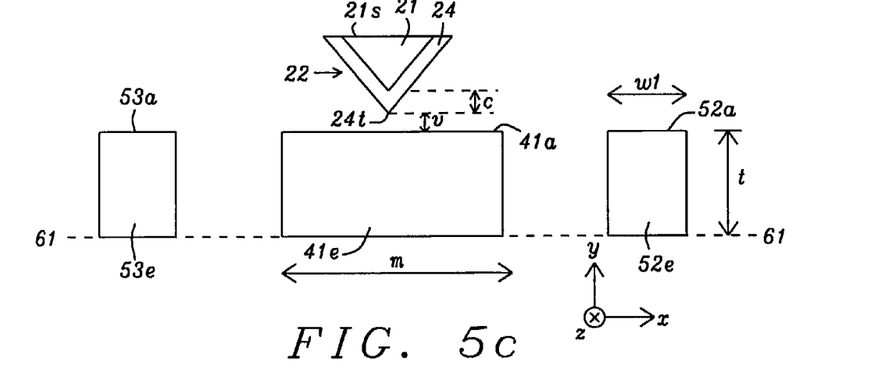
Figure 5D:
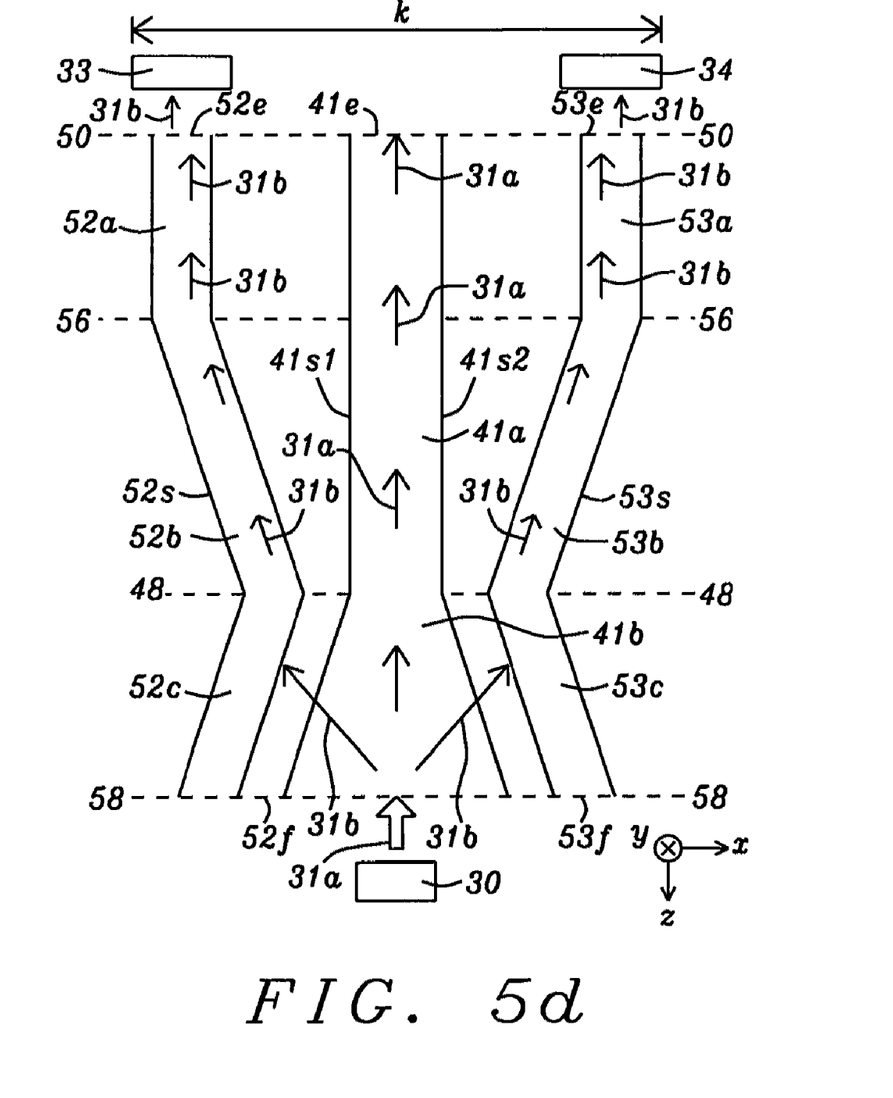
FIG. 5d is a top-down view of the waveguide structure depicted in FIGS. 5a-5b where light propagates from a light source into a main waveguide and then is partially diverted into two AWVG before reaching photo detectors in an alignment process.

Similar to AWVG 42 and AWVG 43 in the first embodiment, AWVG 52 and AWVG 53 are key features of the third embodiment and are included as critical components of an alignment scheme where a small portion of light 31a, typically 0.5% to 10% of the light intensity captured by main waveguide section 41c from a light source 30 and transmitted toward the ABS, is diverted into each AWVG as depicted with respect to FIG. 5d. The light intensity diverted into the AWVG 52, 53 is a small fraction of the light propagated toward the ABS in the main waveguide so as not to disturb the single transmission mode in the main waveguide. Coupling length h3, coupling gap width w4, and AWVG width w1 (FIG. 5b) may be adjusted to modify the intensity of light 31b captured by AWVG 52, 53 along sections 52c, 53c, respectively. One or more of the following changes may result in an increase in light intensity diverted into AWVG 52, 53: (1) increase in length h3; (2) increase in width w1, and (3) decrease in gap width w4. However, as indicated previously, parameters (1)-(3) are interdependent on one another and adjusting one may affect the contribution of the other two to coupling efficiency. Furthermore, the oscillation behavior of light 31a in the main waveguide may play a role in coupling efficiency.

Figure 5E:
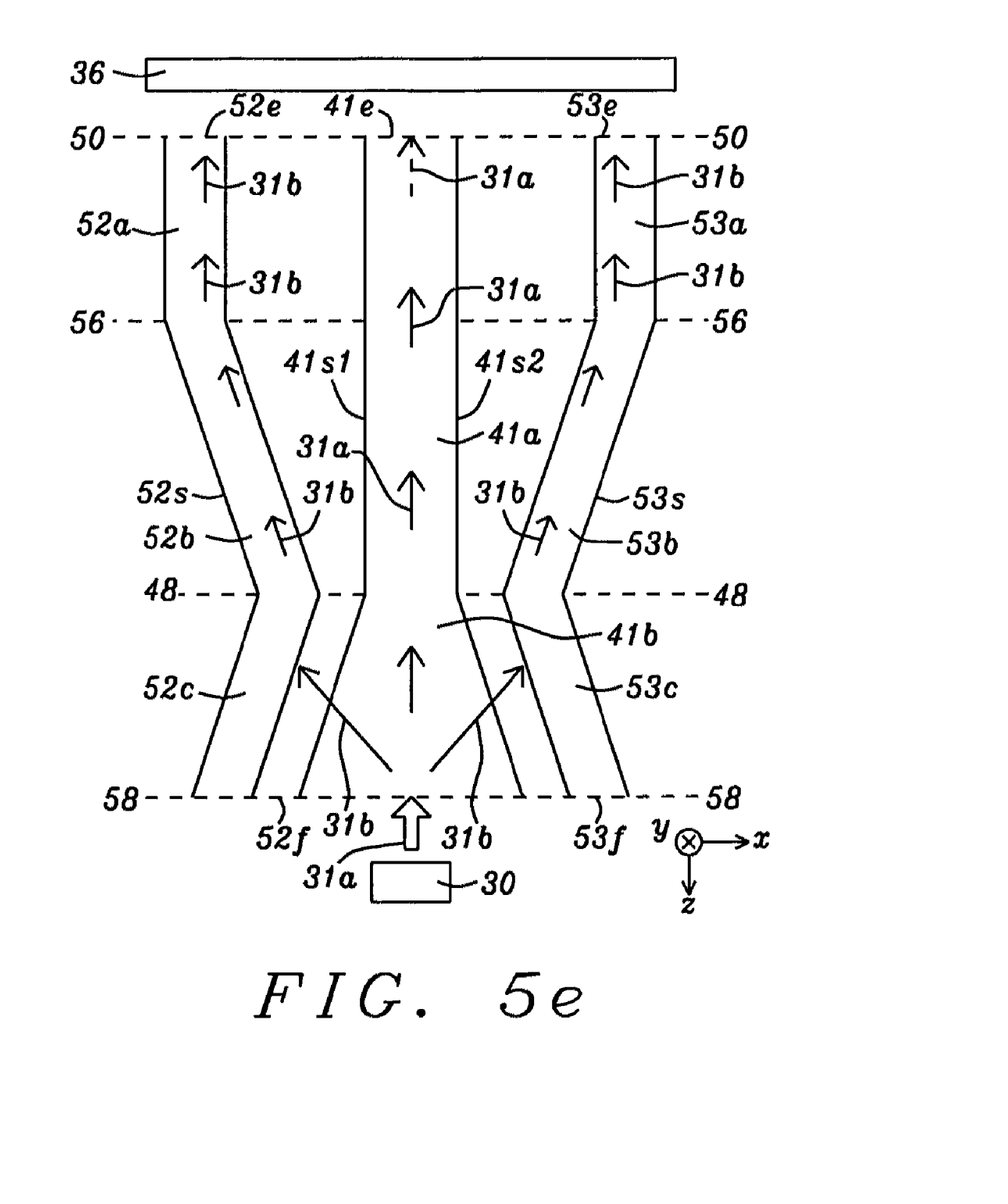
FIG. 5e shows a similar light distribution during a TAMR write process.

According to the exemplary embodiment in FIG. 5d, light 31b is captured by AWVG sections 52c, 53c, transmitted to the ABS at ends 52e, 53e, respectively, and exits through an outlet or aperture (not shown) where light 31b is then directed to a photo detector (PD) 33, 34, respectively. Light intensity detected at end 52e by PD 33 is $l_{AWVG1}$, and light intensity detected at end 53e by PD 34 is $l_{AWVG2}$. Optimum alignment for the light source 30 is realized when $|l_{AWVG1}-l_{AWVG2}|$ reaches a minimum value at a certain cross-track position and when $(l_{AWVG1}+l_{AWVG2})$ reaches a maximum value at a certain down-track position as described earlier. Light 31a that is not diverted to an AWVG continues to propagate to the ABS but is not measured during the alignment process. However, during a subsequent TAMR write process (after device fabrication is completed) as depicted in FIG. 5e, light 31a is coupled to an EPG (not shown) and transformed to plasmon waves 31c that exit end 41e and are then transmitted to a localized spot on magnetic medium 36 where a magnetic field is simultaneously directed during the write process.

Referring to FIG. 5c, an ABS view is shown of the waveguide structure depicted in FIG. 5b and also includes an EPG 22 having a vertex 24t facing a top surface of main waveguide section 41a according to one embodiment of the present invention. Preferably, AWVG section 52a and AWVG section 53a have a thickness t which is essentially the same as that of main waveguide section 41a, and all sections 41a, 52a, 53a are formed on the same plane 61-61 in order to improve the efficiency of light coupling from the main waveguide into the AWVG. In other words, sections 41a, 52a, 53a each have bottom surfaces that are essentially coplanar according to a preferred embodiment. On the other hand, the width w1 of sections 52a, 53a may be advantageously less than the width m of section 41a in order to improve the sensitivity of alignment measurements and thereby improve their accuracy.

Figure 6:
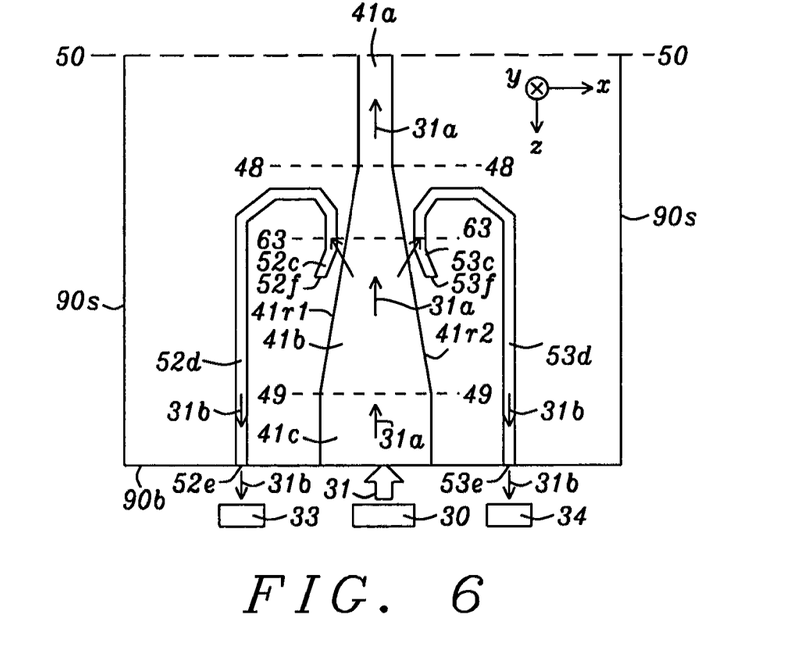
FIGS. 6, 7 are top-down views of a waveguide structure where two AWVG are curved and have an outlet at the back end and side, respectively, of the slider according to additional embodiments of the present invention.

Referring to FIG. 6, a fourth embodiment is depicted wherein each of AWVG 52, 53 has an outlet at the back end of the slider that faces away from the ABS. In this case, the light coupling sections 52c, 53c are retained from the third embodiment, but first and second sections of each AWVG 52, 53 are replaced by a curved section 52d, 53d, respectively, that connects with an end of a light coupling section along plane 63-63 and then curves at least 180 degrees to terminate with a second end 52f, 53f, respectively, at the back end 90b of the slider. Preferably, each section 52d, 53d has the same width as that of light coupling sections 52c, 53c. Each end 52f, 53f has an outlet or aperture that directs light 31b into a PD 33, 34, respectively, or to a CCD camera that has a field of view wide enough to capture an image of light exiting from both AWVG outlets. Slider sides 90s are also included in this drawing. Note that an end of light coupling section 52c (or 53c) does not necessarily adjoin plane 48-48 as in the third embodiment. Thus, light 31a is partially diverted from main waveguide section 41b into light coupling sections 52c, 53c and light intensity of light 31b is measured by PD 33, 34 during an alignment procedure. During a TAMR write process, light 31a is substantially transformed into plasmon waves 31c as illustrated in previous embodiments and diverted light 31b is not used for any purpose.

The present invention also anticipates an alternative embodiment (not shown) wherein the light coupling sections 52c, 53c have an end at plane 48-48 and sections 52d, 53d are partially formed between plane 48-48 and the ABS before terminating at the back end 90b of the slider. In yet another embodiment (not shown), light coupling sections 52c, 53c may be formed parallel to a side of main waveguide section 41c before connecting with curved sections 52d, 53d, respectively, and terminating at the back end 90b. In the latter example, light 31a is partially diverted from main waveguide section 41c for alignment purposes. Although the exemplary embodiment shows the curved sections 52d, 53d as being comprised of multiple straight segments, the present invention also encompasses an embodiment wherein there is a continuous curvature in the portion of sections 52d, 53d between plane 63-63 and ends 52e, 53e, respectively.

Figure 7:
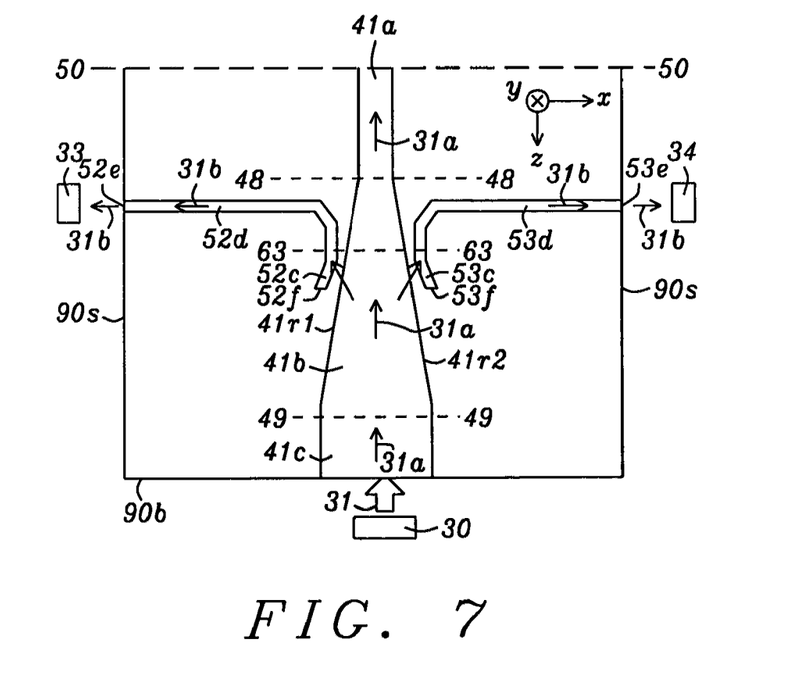

Referring to FIG. 7, a fifth embodiment is illustrated that represents a modification of the embodiment shown in FIG. 6 and features AWVG 52, 53 wherein each AWVG has an outlet at a side 90s of the slider. In this case, light coupling sections 52c, 53c are retained from the previous embodiment, but the curved sections 52d, 53d, respectively, that connect with an end of a light coupling section along plane 63-63 curve less than 180 degrees and terminate with a second end 52f, 53f, respectively, along the nearest side 90s of the slider. Each end 52f, 53f has an outlet or aperture that directs light 31b into a PD 33, 34, respectively, or into a CCD camera. In the exemplary embodiment, an end of a light coupling section 52c, 53c adjoins an end of curved section 52d, 53d, respectively, along the plane 63-63 that is parallel to the ABS 50-50. Alternatively, light coupling sections 52c, 53c may be aligned parallel to main waveguide section 41b and connect with curved sections 52d, 53d, respectively, along plane 48-48. Thus, light 31a is partially diverted from main waveguide section 41b into AWVG 52, 53 during an alignment procedure. In yet another embodiment (not shown), light coupling sections 52c, 53c may be formed parallel to a side of main waveguide section 41c before connecting with curved section 52d, 53d, respectively, and terminating at a side 90s. In the latter example, light 31a is partially diverted from waveguide section 41c rather than from section 41b. It should be understood that the curved sections 52d, 53d may be comprised of multiple straight segments or a continuous curvature in a region between plane 63-63 and side 90s.

Figure 8:
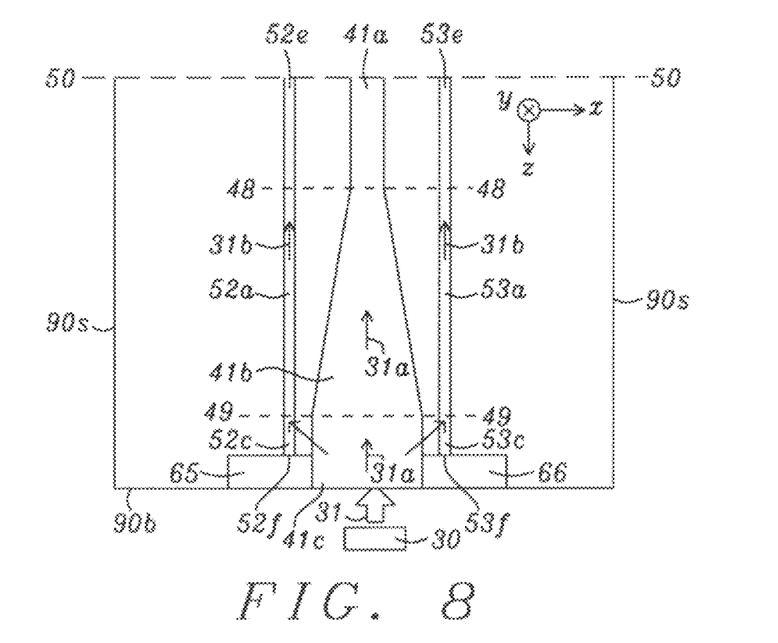
FIG. 8 is a top-down view of another embodiment of the present invention wherein the AWVG are formed a coupling gap distance from the third main waveguide section and each AWVG extends as a single straight section to the ABS.

Referring to FIG. 8, yet another embodiment of the present invention is shown wherein each AWVG 52, 53 is a straight structure that extends from the ABS 50-50 along a z-axis direction to an end 52f, 53f, respectively, beyond plane 49-49 where second main waveguide section 41b adjoins third main waveguide section 41c. In particular, AWVG 52, 53 comprise sections 52a, 53a and light coupling sections 52c, 53c, respectively, wherein the light coupling sections each have an end along plane 49-49, are aligned parallel to third main waveguide section 41c, and are separated therefrom but a coupling gap distance w2. Coupling gap length is d4. In one embodiment, light coupling sections 52c, 53c have an end 52f, 53f, respectively, that abuts a light block 65, 66, respectively, which is employed to prevent light from the light source 30 from directly entering the coupling sections without first being transmitted through main waveguide section 41c. Light blocks 65, 66 may be made of an opaque material such as Au, Ag, Cu, Ru, or Ta and preferably have a width in the cross-track direction that is greater than width w1 of the AWVG 52, 53. Preferably, each AWVG has a uniform width along its entire length.

Figure 9:
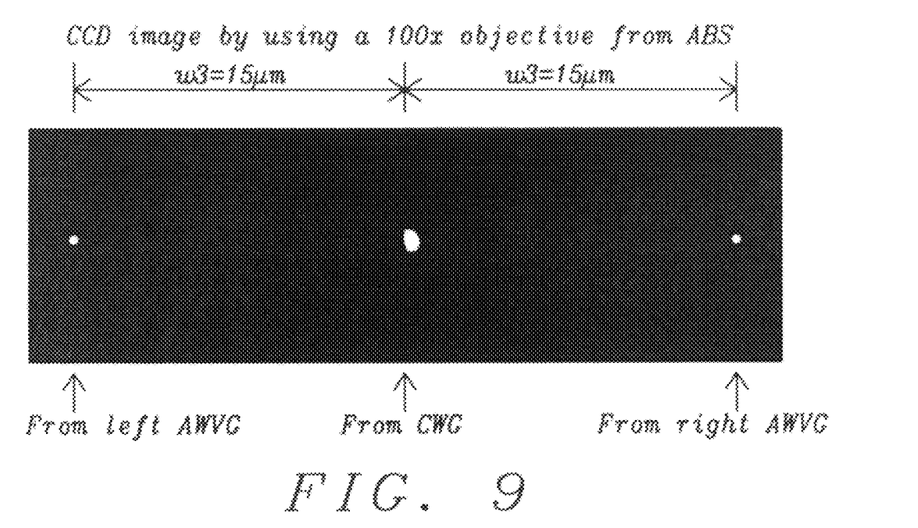
FIG. 9 is a sample CCD camera image of light intensity from two AWVG having outlets at the ABS according to an embodiment of the present invention.

Referring to FIG. 9, a sample image is provided which was taken from a CCD camera with a 100× objective that was positioned at the ABS to monitor light emitted from two AWVG and a center waveguide (CWG) during an alignment process. In this example, w3=15 microns, coupling gap distance w2 is 0.2 microns, coupling length d1 is 8 microns, AWVG width w1 is 600 microns, and the CWG width is 600 microns.

Figure 10:
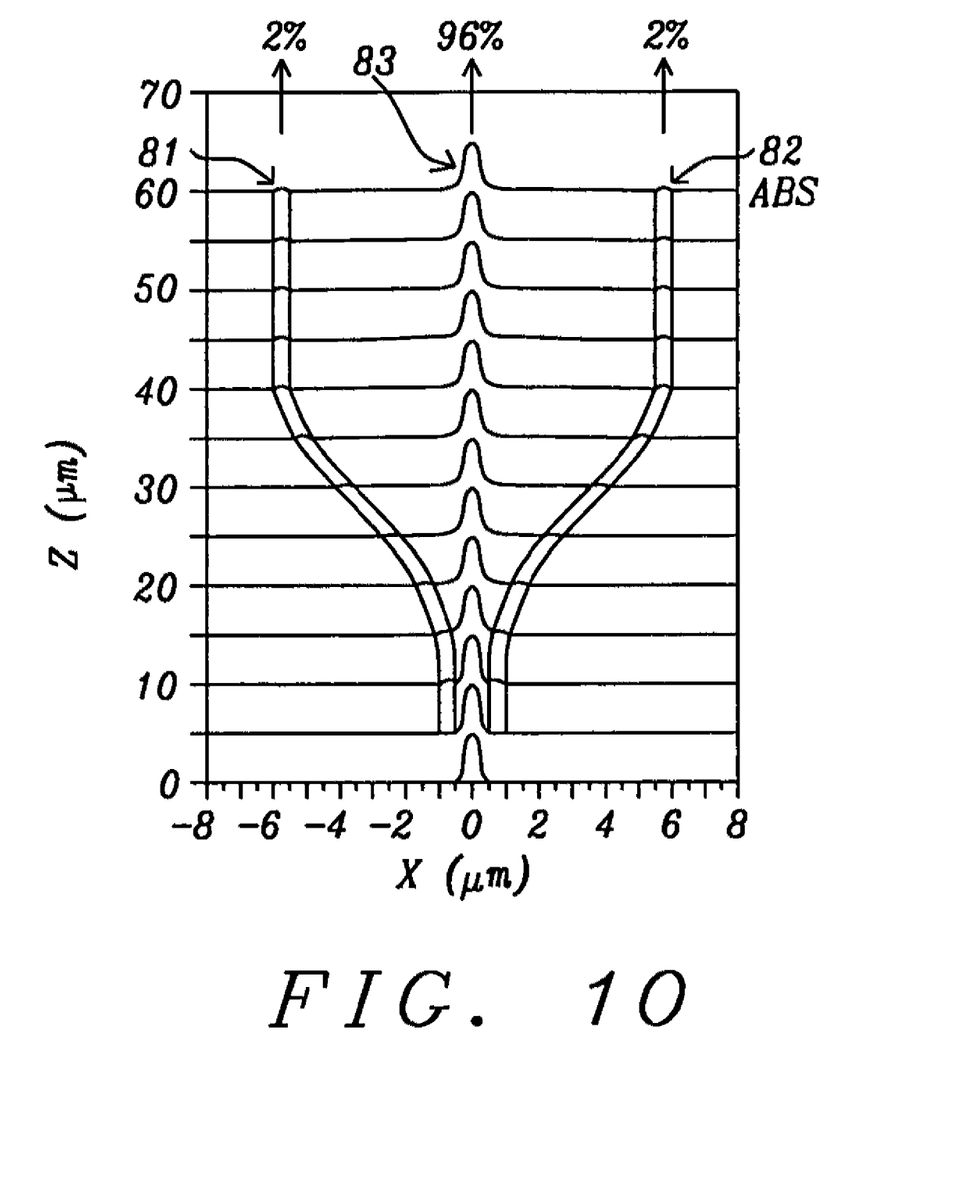
FIG. 10 is a plot that shows modeling results of the light intensity within the two alignment waveguides and the main waveguide according to the second embodiment of the present invention.

Referring to FIG. 10, a plot of light intensity in the center (CWG) and alignment waveguides (AWVG) according to an embodiment of the present invention is illustrated using modeling data. The z coordinate=60 microns represents the ABS position in the plot and the x-axis is the cross-track direction.

In this case, the coupling gap distance is 0.25 microns, coupling length is 5 microns, and the w3 distance between AWVG and CWG is 6 microns. Intensity of the light measured by a PD or CCD camera at the ABS is represented by peaks 81 and 82 for AWVG and peak 83 for CWG. Only 2% of light is diverted into each AWVG in this configuration and 96% is retained in the CWG.

In all embodiments, the alignment scheme according to the present invention comprises two alignment waveguides formed in a symmetrical fashion on either side of a central waveguide wherein each waveguide diverts from 0.5% to 10% of the light transmitted through the main waveguide to an outlet at the ABS, or at the side or back end of the slider. Light intensity at the two outlets is measured as $l_{AWVG1}$ and $l_{AWVG2}$ for a plurality of light source positions at the back end of the main waveguide, and alignment is achieved when the (x, y) coordinate of the light source simultaneously results in a minimum value for $|l_{AWVG1}-l_{AWVG2}|$ and a maximum value for $(l_{AWVG1}+l_{AWVG2})$. Alignment is typically done during TAMR head fabrication just prior to permanently attaching the light source to the waveguide. However, it is conceivable that a technology may be developed where a free space light beam may be aligned one or more times after a TAMR fabrication sequence is completed. Thus, the present invention anticipates that the alignment process described herein may be applied a plurality of times in an embodiment where the light source is a free space light beam focused through a lens or other optical device into a main waveguide of a TAMR head.

The present invention provides an advantage over the prior art in that it generates accurate light intensity readings from two AWVG outlets wherein the sum and difference of two measurements are readily obtained and calculated to determine optimum alignment without undertaking more complicated intensity and pattern measurements relied upon in prior art alignment methods. As a result of the more accurate alignment, there is a reduced power requirement placed on the light source which prolongs its lifetime and avoids the need for larger light sources that have a detrimental impact on adapting TAMR head designs where there is usually limited space available at the back end of a slider. Alignment waveguides may be formed during the same process sequence that produces a main waveguide, especially for embodiments where the AWVG and main waveguide have bottom surfaces formed on the same plane and have essentially equal thicknesses as depicted in the exemplary embodiments. Therefore, no additional tools or process steps are required to fabricate alignment structures of the present invention.

While this invention has been particularly shown and described with reference to, the preferred embodiment thereof, it will be understood by those skilled in the art that various changes in form and details may be made without departing from the spirit and scope of this invention.

We claim:

1. A thermally assisted magnetic recording (TAMR) head comprising:
   (a) a light source that generates light and transmits said light into a main waveguide and towards an air bearing surface (ABS);
   (b) the main waveguide for transmitting light to a nearfield device at the ABS, said main waveguide has a lengthwise dimension in a direction perpendicular to the ABS with an end at the ABS, an opposite end facing said light source, and comprising:
      (1) a first rectangular shaped section from a down-track perspective including the first end at the ABS, a second end formed a first distance from the ABS and interfacing with a first end of a second main waveguide section along a first plane, and two parallel sides between the ABS and first plane;
      (2) the second section that has a trapezoidal shape, a second end having a greater width in a cross-track direction than the first end at the first plane, and two sides connecting said first and second ends of said second section; and
      (3) a third section comprising a first end interfacing with the second end of the second section along a second plane that is parallel to the first plane and to the ABS, the second end facing the light source, and two parallel sides aligned perpendicular to the ABS; and
   (c) an alignment waveguide (AWVG) structure including a first AWVG and a second AWVG each formed along a side of the main waveguide, said first and second AWVG are symmetrically formed about a plane that bisects the main waveguide in the lengthwise direction and each AWVG comprises:
      (1) a first AWVG section formed substantially parallel to the main waveguide and located a second distance therefrom, said first AWVG section has a width in a cross-track direction, an end with a light outlet at the ABS, and a second end that adjoins a first end of a second AWVG section;
      (2) the second AWVG section that has a width in the cross-track direction, the first end at an interface with the first AWVG section, and a second end that adjoins a first end of a light coupling section wherein said second end of the second AWVG section is formed a lesser distance from the main waveguide than the first end of the second AWVG section; and
      (3) the light coupling section formed substantially parallel to a side of the main waveguide and located a coupling gap distance therefrom, said light coupling section captures a certain percentage of light from the main waveguide, and has a width in a cross-track direction, a coupling length, and includes an end facing away from the ABS.

2. The TAMR head of claim 1 wherein the light coupling section of each AWVG is aligned substantially parallel to the first section of the main waveguide.

3. The TAMR head of claim 1 wherein the light coupling section of each AWVG is aligned parallel to the second section of the main waveguide.

4. The TAMR head of claim 1 wherein the certain percentage of light (light intensity) captured by the light coupling section in each of the first and second AWVG is between about 0.5% and 10% of the light transmitted through the main waveguide, said captured light intensity may be increased by making one or more adjustments including a reduction of the coupling gap distance, increasing the coupling length, and increasing the width of the light coupling sections.

5. The TAMR head of claim 1 wherein the widths of the first and second AWVG sections and of the coupling sections are equivalent and between about 0.4 and 0.8 microns.

6. The TAMR head of claim 2 wherein the end of each light coupling section terminates between the ABS and the first plane, or at the first plane.

7. The TAMR head of claim 1 wherein the outlet for each of the two AWVG is between about 2 and 20 microns from a side of the main waveguide at the ABS.

8. The TAMR head of claim 1 wherein the coupling gap distance is from about 0.1 to 0.4 microns and the coupling length is between about 1 and 20 microns.

9. A thermally assisted magnetic recording (TAMR) head comprising:

(a) a light source that generates light and transmits said light into a main waveguide and towards an air bearing surface (ABS);

(b) the main waveguide for transmitting light to a near field device at the ABS, said main waveguide has a lengthwise dimension in a direction perpendicular to the ABS with an end at the ABS, an opposite end facing said light source, and comprising:

(1) a first rectangular shaped section from a down-track perspective including the first end at the ABS, a second end formed a first distance from the ABS and interfacing with a first end of a second section along a first plane;

(2) the second section that has a trapezoidal shape, a second end having a greater width in a cross-track direction than the first end at the first plane, and two sides connecting said first and second ends of said second section; and (3) a third section with a first end interfacing with the second end of the second section along a second plane parallel to the first plane and to the ABS, the second end facing the light source, and two parallel sides aligned perpendicular to the ABS; and (c) an alignment waveguide (AWVG) structure including a first AWVG and a second AWVG each formed along a side of the main waveguide, said first and second AWVG are symmetrically formed about a plane that bisects the main waveguide in the lengthwise direction and each AWVG comprises:

(1) a light coupling section formed substantially parallel to a side of the main waveguide and located a coupling gap distance therefrom, said light coupling section captures a certain percentage of light from the main waveguide and includes an end facing away from the ABS, and has a width in a cross-track direction, a coupling length, and a second end that connects with a first end of a second AWVG section; and (2) the second AWVG section which has a width, the first end adjoining the light coupling section, and a second end with an outlet that delivers light to a light measurement device to enable alignment of the light source to the main waveguide.

10. The TAMR head of claim 9 wherein the outlet of each AWVG is at the ABS and is separated from a side of the main waveguide by a distance from about 2 to 20 microns.

11. The TAMR head of claim 9 wherein the outlet of each AWVG is at a nearest side of a slider on which the TAMR head is formed, or each AWVG outlet is at a back end of the slider.

12. The TAMR head of claim 9 wherein the percentage of light captured by the light coupling section in each AWVG is between about 0.5% and 10% of the light transmitted through the main waveguide, said percentage may be increased by making one or more adjustments including a reduction of the coupling gap distance, increasing the coupling length, and increasing the width of the light coupling sections.

13. The TAMR head of claim 9 wherein a light coupling section is formed along a side of the second main waveguide section.

14. The TAMR head of claim 9 wherein a light coupling section is formed along a side of the third main waveguide section.

15. The TAMR head of claim 14 wherein the end of each light coupling section facing away from the ABS contacts a light block to prevent light from directly entering the AWVG from the light source.

16. The TAMR head of claim 15 wherein each AWVG is a straight structure formed perpendicular to the ABS and having an outlet at the ABS.

17. The TAMR head of claim 9 wherein the coupling gap distance is from about 0.1 to 0.4 microns and the coupling length is between about 1 and 20 microns.

18. The TAMR head of claim 9 wherein the widths of the second AWVG sections and of the light coupling sections are equivalent and between about 0.4 and 0.8 microns.

19. A method for aligning a light source to a main waveguide in a TAMR head fabrication scheme, comprising:

(a) providing a slider and a partially completed TAMR head thereon, said TAMR head comprises:

(1) a main waveguide for transmitting light to a near field device at an air bearing surface (ABS), said main waveguide has a lengthwise dimension in a direction perpendicular to the ABS with an end at the ABS, and an opposite end at a back end of the slider;

(2) an alignment waveguide (AWVG) structure including a first AWVG and a second AWVG each formed adjacent to the main waveguide, said first and second AWVG are symmetrically formed about a plane that bisects the main waveguide in the lengthwise direction and each AWVG comprises:

a light coupling section formed substantially parallel to a side of the main waveguide and located a coupling gap distance therefrom, said light coupling section captures a certain percentage of light from the main waveguide and includes an end facing away from the ABS, and has a width in a cross-track direction, a coupling length, and a second end that connects with a first end of a second AWVG section; and the second AWVG section having the first end adjoining the light coupling section, a second end with an outlet that delivers light to a light measurement device, and two parallel sides connecting first and second ends thereof;

(b) directing a light from a light source into an end of the main waveguide at the back end of the slider and measuring a light intensity $l_{AWVG1}$ at the outlet of the first AWVG and a light intensity $l_{AWVG2}$ at the outlet of the second AWVG, and adjusting the position of the light source until reaching a point where $(l_{AWVG1}-l_{AWVG2})$ is a maximum value and $|l_{AWVG1}-l_{AWVG2}|$ is a minimum value; and (c) affixing the light source to the back end of the slider at said point.

20. The method of claim 19 wherein the light measurement device is a photo detector or a CCD camera linked to a computer for converting an image into light intensity values, said CCD camera has a sufficiently large field of view to simultaneously capture light exiting from both AWVG outlets.

21. The method of claim 19 wherein each AWVG light coupling section captures between about 0.5% and 10% of the light transmitted through the main waveguide.

22. The method of claim 19 wherein the outlet of each AWVG is at the ABS and is separated from a side of the main waveguide by a distance from about 2 to 20 microns.

23. The method of claim 19 wherein the outlet of each AWVG is at a side of the slider, or each AWVG outlet is at the back end of the slider.

24. The method of claim 19 wherein the coupling gap distance is from about 0.1 to 0.4 microns and the coupling length is between about 1 and 20 microns.

\* \* \* \* \*